US007693619B2

(12) United States Patent
Elgersma et al.

(10) Patent No.: US 7,693,619 B2
(45) Date of Patent: Apr. 6, 2010

(54) METHOD AND SYSTEM FOR CONTROLLING SETS OF COLLINEAR CONTROL MOMENT GYROSCOPES WITH OFFSET DETERMINATION WITHOUT ATTITUDE TRAJECTORY OF SPACECRAFT

(75) Inventors: Michael R. Elgersma, Plymouth, MN (US); Daniel P. Johnson, Fridley, MN (US); Mason A. Peck, Ithaca, NY (US); Brian K. Underhill, Glendale, AZ (US); Gunter Stein, St. Paul, MN (US); Blaise G. Morton, Minnetonka, MN (US); Brian J. Hamilton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 553 days.

(21) Appl. No.: 11/291,706

(22) Filed: Nov. 30, 2005

(65) Prior Publication Data
US 2007/0124032 A1    May 31, 2007

(51) Int. Cl.
*B64G 1/36*    (2006.01)
*B64G 1/10*    (2006.01)
(52) U.S. Cl. ............ 701/13; 244/158.6; 244/164; 244/165; 244/171; 244/179; 701/4; 701/14
(58) Field of Classification Search .......... 244/158.6
See application file for complete search history.

(56) References Cited
U.S. PATENT DOCUMENTS
4,504,032 A * 3/1985 Phillips et al. ........... 244/170

6,039,290 A * 3/2000 Wie et al. .............. 244/165

(Continued)

FOREIGN PATENT DOCUMENTS
EP    1002716 A1    5/2000

(Continued)

OTHER PUBLICATIONS

Kuhns et al., "Singularity Avoidance Control Laws for a Multiple CMG Spacecraft Attitude Control System", Jun. 1994, Proceedings of the American Control Conference, vol. 3, pp. 2892-2893.*

(Continued)

*Primary Examiner*—Thomas G Black
*Assistant Examiner*—Sze-Hon Kong
(74) *Attorney, Agent, or Firm*—Ingrassia Fisher & Lorenz, P.C.

(57) ABSTRACT

A control system of a spacecraft for controlling two or more sets of collinear control moment gyroscopes (CMGs) comprises an attitude control system. The attitude control system is configured to receive a command to adjust an orientation of the spacecraft, determine an offset for a momentum disk for each of the two or more sets of CMGs that maximizes torque, determine a momentum needed from the two or more sets of CMGs to adjust the orientation of the spacecraft, and calculate a total torque needed by taking the derivative of the momentum. The control system further comprises a momentum actuator control processor coupled to the attitude control system, the momentum actuator control processor configured to calculate a required gimbal movement for each of the CMGs in each of the two or more sets of collinear CMGs from total torque.

15 Claims, 5 Drawing Sheets

U.S. PATENT DOCUMENTS

| | | | |
|---|---|---|---|
| 6,154,691 A * | 11/2000 | Bailey | 701/13 |
| 6,305,647 B1 * | 10/2001 | Defendini et al. | 244/165 |
| 6,648,274 B1 * | 11/2003 | Bailey et al. | 244/165 |
| 6,766,227 B2 * | 7/2004 | Needelman et al. | 701/13 |
| 6,917,862 B2 * | 7/2005 | Wie | 701/13 |
| 6,921,049 B2 * | 7/2005 | Fowell | 244/164 |
| 7,171,290 B2 * | 1/2007 | Lagadec et al. | 701/13 |
| 2004/0111194 A1 | 6/2004 | Wie | |
| 2006/0027708 A1 | 2/2006 | Peck et al. | |

FOREIGN PATENT DOCUMENTS

| | | |
|---|---|---|
| EP | 1777158 A1 | 4/2007 |
| FR | 2826470 A1 | 12/2002 |
| WO | 9947419 A1 | 9/1999 |

OTHER PUBLICATIONS

EP Search Report, 06124900.9 dated Aug. 11, 2008.

* cited by examiner

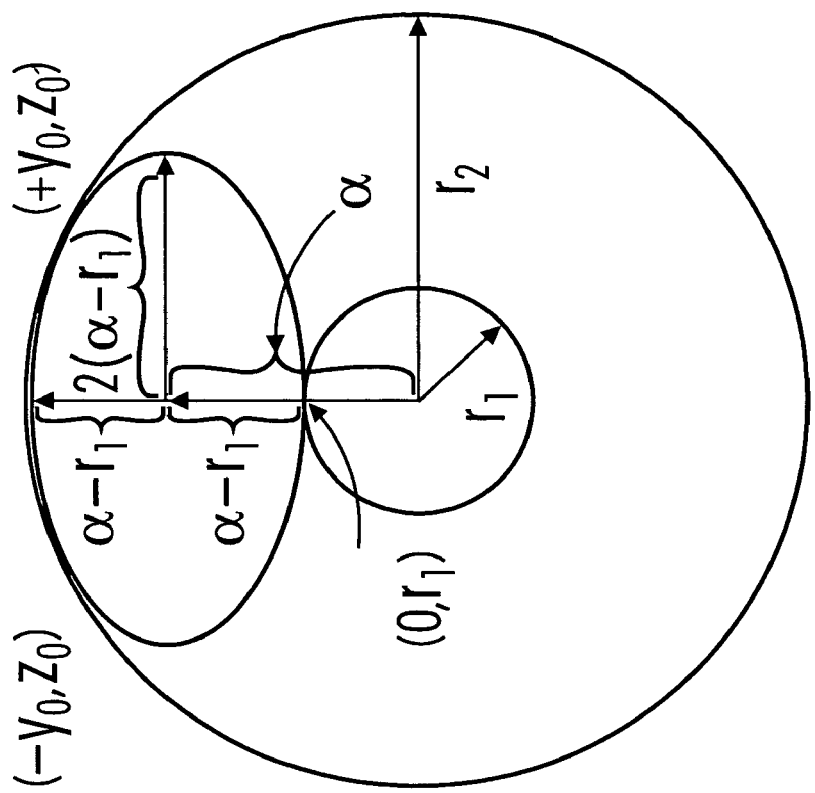
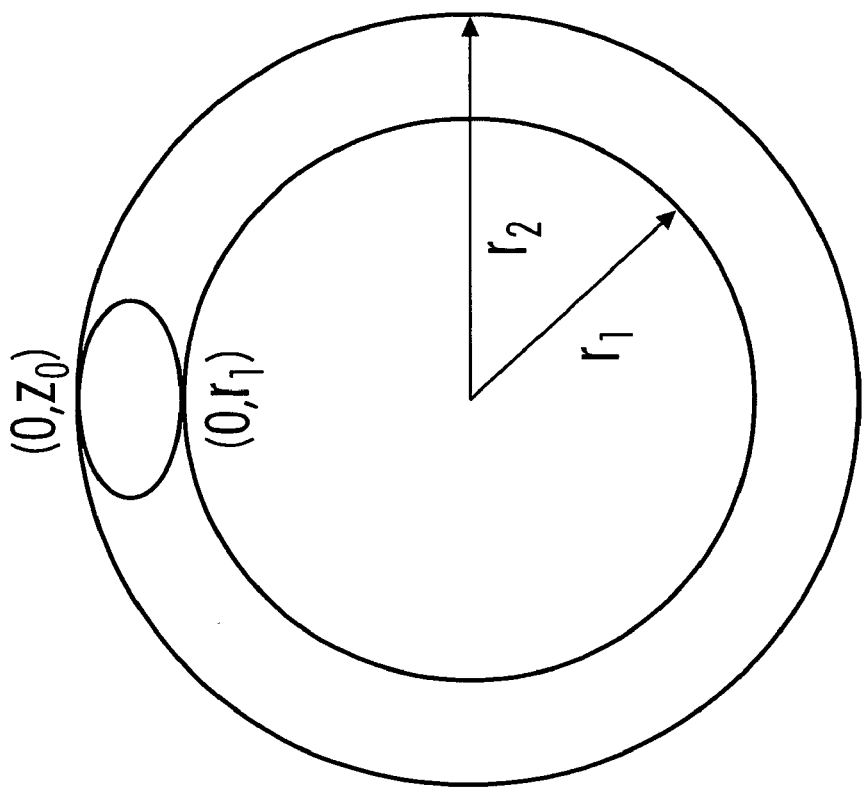
Fig. 4b
Fig. 4a

METHOD AND SYSTEM FOR CONTROLLING SETS OF COLLINEAR CONTROL MOMENT GYROSCOPES WITH OFFSET DETERMINATION WITHOUT ATTITUDE TRAJECTORY OF SPACECRAFT

FIELD OF THE INVENTION

This invention relates to the field of spacecraft vehicle control and, more specifically, to a method and system for controlling sets of collinear control moment gyroscopes.

BACKGROUND OF THE INVENTION

In order to control the attitude of a spacecraft, various rotating inertia members can be used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve, full attitude control of a spacecraft, a CMG array, including a minimum of three CMGs may be arranged such that each CMG in the CMG array imparts torque about a linearly independent axis. Typically, additional CMGs are provided for redundancy purposes and to assist with singularity avoidance. A singularity can occur when the momentum vectors of the CMGs line up such that one or more components of the requested torque can not be provided. Rather than just ensuring that provided torque does not go to zero, this invention guarantees that provided torque equals requested torque, whenever requested torque values stay below some threshold.

Several different techniques have been developed to avoid singularities. In one method it is first noted that a Jacobian matrix A maps the CMG gimbal rates into a three dimensional array torque:

$$A\omega = \tau \quad (1)$$

where A is a 3×n Jacobian matrix, $\omega$ is a n×1 array of gimbal rates for the n gimbals, and $\tau$ is a 3×1 array of torque components to be imparted to the spacecraft. From the above equation and with a known torque command, $\tau$, the individual gimbal rates for each CMG can be calculated. Using the known Moore-Penrose pseudoinverse to invert the Jacobian matrix, a set of possible gimbal rates is:

$$\omega = A^T(AA^T)^{-1}\tau. \quad (2)$$

As discussed previously, inherent in the use of CMGs is the possibility that the CMGs' momentum vectors may line up in such a way that a singularity condition is reached. Mathematically, singularities can occur when the eigenvalues of $AA^T$ approach zero, causing $(AA^T)^{-1}$ to approach infinity. Equivalently, singularities occur when the determinant of the matrix $AA^T$ is equal to zero (expressed algebraically as det $(AA^T) = 0$). In the case of a 3×n matrix A, this is equivalent to the rank of the matrix $AA^T$ being two or less.

Different approaches have been devised to avoid singularities in the movement of CMGs. In one approach, to ensure that $(AA^T)^{-1}$ is never zero, $(AA^T)^{-1}$ is replaced by $(AA^T + \epsilon I)^{-1}$ where I is the identity matrix and $\epsilon$ is a small number. The use of a positive $\epsilon$ ensures that det $(AA^T + \epsilon I)^{-1}$ never becomes 0.

While useful in some instances, a drawback to this approach is that it changes the gimbal rate calculation. In the case of the Jacobian A, the use of the pseudoinverse means that gimbal rates are no longer exactly mapped into the commanded torques because of the error $\epsilon$ introduces. This resulting error steers the spacecraft in the wrong direction and can introduce significant, undesired torque, especially near the singularity.

A second approach is to limit the CMG array's momentum output to a smaller area within a momentum envelope. The momentum envelope is the momentum provided in all possible combinations of the CMGs in the CMG array. In one exemplary embodiment, depending on the CMG arrangement, by operating within one-third or less of the total momentum envelopes, singularities can be avoided. However, this approach wastes potential torque and results in systems that are larger and heavier than needed.

In view of the foregoing, it is desirable to provide a method for controlling sets of collinear CMGs that addresses one or more of the foregoing deficiencies or other deficiencies not implicitly or expressly described. It is also desirable to provide a system for controlling sets of collinear CMGs that addresses one or more of the foregoing deficiencies or other deficiencies not implicitly or expressly described. Furthermore, other desirable factors and characteristics of the present invention will become apparent from the subsequent detailed description and the appended claims, taken in conjunction with the accompanying drawings and the foregoing technical field and background.

SUMMARY OF THE INVENTION

In an exemplary embodiment a method for controlling the movement of two or more sets of collinear control moment gyroscope (CMGs) in an array of CMGs in a spacecraft is disclosed. In a first step, an offset for each CMG set of the two or more sets of collinear CMGs to maximize available torque is determined. Next, a total torque to adjust the orientation of the spacecraft is calculated. The total torque is allocated to produce an allocated torque for each set of the two or more sets of collinear CMGs. Then, a required gimbal movement for each set of the CMGs in the two or more sets of collinear CMGs from the allocated torque is calculated.

A control system of a spacecraft for controlling two or more sets of collinear control moment gyroscopes (CMGs) comprises an attitude control system. The attitude control system is configured to receive a command to adjust an orientation of the spacecraft, determine an offset for a momentum disk for each of the two or more sets of CMGs that maximizes available torque, determine a momentum needed from the two or more sets of CMGs to adjust the orientation of the spacecraft, and calculate a total torque needed by taking the derivative of the momentum. The control system further comprises a momentum actuator control processor coupled to the attitude control system, the momentum actuator control processor configured to calculate a required gimbal movement for each of the CMGs in each of the two or more sets of collinear CMGs from total torque.

In another embodiment, a method for singularity-free movement of an array of control moment gyroscopes (CMGs) comprises a first step of allocating the array of CMGs as at least two sets of collinear CMGs. Next, an offset for a momentum ellipse for each of the two sets of CMGs that maximizes torque is calculated. Then, a momentum radius f(A) that defines a sphere of allowable momentum is determined. Next, it is determined whether a requested momentum to change the orientation of a spacecraft is within the sphere of allowable momentum. Then, a gimbal movement for each CMG to provide the requested momentum is determined if the requested momentum is within the sphere of allowable momentum.

BRIEF DESCRIPTION OF THE DRAWINGS

The present invention will hereinafter be described in conjunction with the following drawing figures, wherein like numerals denote like elements, and:

FIGS. 4a and 4b illustrate momentum ellipses for different solutions that maximize the ellipses in an annular region.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
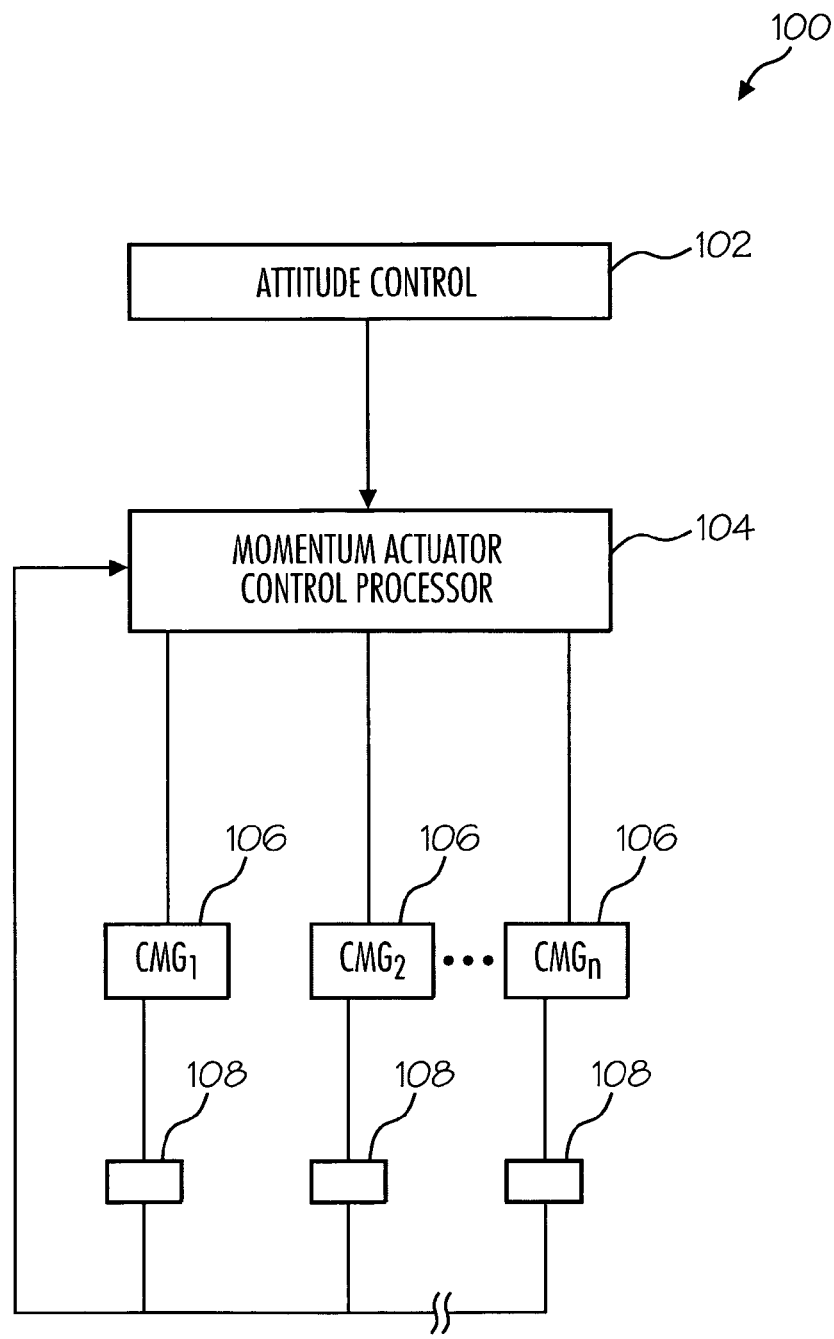
FIG. 1 is a block diagram illustrating an exemplary CMG control system in accordance with an exemplary embodiment of the present invention.

An exemplary control system 100 for implementing the present invention is illustrated in FIG. 1. The components of the control system 100 are known in the art and can be assembled in different ways using different processors, software, controllers, sensors, and the like. Additionally, various computational functionalities that are typically provided by one part of the system can instead be provided by another part. The system 100 as shown in FIG. 1 includes parts that are pertinent to the discussion of the present invention and the system 100 may include other elements or systems that might be provided in a control system and which are well known and not shown in FIG. 1.

The control system 100 includes an attitude control system 102 coupled to a momentum actuator control processor 104. CMGs 106 are coupled the momentum actuator control processor 104. Associated with each CMG 106 are one or more CMG sensors 108 for providing information concerning the state of the CMG 106 to the control system 100. Control system 100, in one embodiment, is mounted on a spacecraft such as an orbiting satellite.

Attitude control system 102 controls the positioning of a spacecraft. The attitude control system 102 receives data concerning a desired spacecraft maneuver and determines an appropriate torque command to complete the desired maneuver. The torque commands can be presented to the momentum actuator control processor 104. The momentum actuator control processor 104, in response to the torque commands, can calculate the gimbal rates necessary to produce the commanded torque. Additionally, the momentum actuator control processor 104 calculates gimbal movement from a momentum path determined by a steering law. The momentum actuator control processor 104, based on these calculations, provides the necessary commands to the CMGs 106 such that the CMG movement produces the commanded torque and, in accordance with the teachings of the present invention, provides the torque while avoiding singularities. This can be accomplished, in one exemplary embodiment, by changing the gimbal angles of the CMGs at a certain gimbal angle rate.

A single-gimbal CMG has constant momentum magnitude, and rotates about one axis. The constant gimbal axis of the $i^{th}$ CMG in a set of CMGs can be denoted with unit vector $p_i \in R^3$, and the momentum vector of the $i^{th}$ CMG in a set of CMGs can be denoted by vector $h_i \in R^3$. The gimbal angle of the $i^{th}$ CMG will be denoted by $\theta_i$. Thus:

$$p_i'^* h_i(\theta_i) = 0$$

$$p_i'^* p_i = 1 \qquad (3)$$

The torque of the $i^{th}$ CMG in a set of CMGs can be denoted by the vector $\tau_i \in R^3$:

$$\tau_i = \frac{dh_i}{dt} = (p_i \times h_i)\dot{\theta}_i \qquad (4)$$

The total momentum and torque of a system of n CMGs can be denoted by:

$$h = \sum_{i=1}^{n} h_i \qquad (5)$$

$$\tau = \sum_{i=1}^{n} \tau_i \qquad (6)$$

One way to arrange CMGs and achieve full attitude control of a spacecraft is to partition multiple CMGs into two or more sets of collinear CMGs. Each CMG in a set of collinear CMGs shares the same gimbal axis direction, but each set of collinear CMGs can have an arbitrary gimbal-axis orientation. In one exemplary embodiment, n CMGs are partitioned into k sets, $S_k$, with unit vectors $\{p_1, p_2, \ldots, p_k\}$ different from each other. In an exemplary embodiment, eight (8) CMGs can be partitioned into three (3) sets, with $\{p_1, p_2, p_3\}$ different from each other:

$S_1 = \{1,4,7\} p_1 = p_4 = p_7$ $S_2 = \{2,5,8\} p_2 = p_5 = p_8$ $S_3 = \{3,6\} p_3 = p_6$

Each set of collinear CMGs produces a momentum space confined within a disc or annulus:

$$h_{disc1} = \sum_{i \in S_1} h_i \quad \text{where} \quad p_1' * h_{disc1} = 0 \qquad (7)$$

$$h_{disc2} = \sum_{i \in S_2} h_i \quad \text{where} \quad p_2' * h_{disc2} = 0$$

$$\vdots$$

$$h_{disc_k} = \sum_{i \in S_k} h_i \quad \text{where} \quad p_k' * h_{disc_k} = 0$$

$$h = \sum_{j=1}^{k} h_{disc_j}$$

If the largest momentum magnitude of any CMG in a collinear set of CMGs is less than or equal to the sum of the momentum magnitudes of all other CMGs, then the total momentum of that set of collinear CMGs will be a disk, otherwise the total momentum will be an annulus. Therefore, a set of two or more collinear CMGs, where each of the CMGs have equal momentum magnitude, will have its total momentum on a disk, while a collinear set of two CMGs with one CMG having more momentum magnitude than the other, results in the total momentum lying within an annulus whose inner radius is the difference of the two momenta.

The momentum, $h_i$ with $i \in S_j$, of a $i^{th}$ CMG in a set of CMGs can be decomposed into one component in the $h_{disc_j}$ direction and the rest in the $p_j \times h_{disc_j}$ direction:

$$h_i = \left(h_i \cdot \frac{h_{disc_j}}{\|h_{disc_j}\|}\right)\frac{h_{disc_j}}{\|h_{disc_j}\|} + \left(h_i \cdot \left(p_j \times \frac{h_{disc_j}}{\|h_{disc_j}\|}\right)\right)\left(p_j \times \frac{h_{disc_j}}{\|h_{disc_j}\|}\right) \quad (8)$$

From Eqn. 4, and noting that $p_j \times (p_j \times h_{disc_j}) = -h_{disc_j}$, torque due to the derivative of momentum is given by:

$$\tau_i = \frac{dh_i}{dt} \quad (9)$$

$$= (p_j \times h_i)\dot{\theta}_i$$

$$= \left[\left(h_i \cdot \frac{h_{disc_j}}{\|h_{disc_j}\|}\right)\left(p_j \times \frac{h_{disc_j}}{\|h_{disc_j}\|}\right) - \left(h_i \cdot \left(p_j \times \frac{h_{disc_j}}{\|h_{disc_j}\|}\right)\right)\frac{h_{disc_j}}{\|h_{disc_j}\|}\right]\dot{\theta}_i$$

Total torque from the total momentum of $h_{disc_j}$ is given by:

$$\tau_{disc_j} = \sum_{i \in S_j} \tau_i \quad (10)$$

Combining Eqns. 9 and 10 gives:

$$\tau_{disc_j} = \quad (11)$$

$$\left[p_j \times \frac{h_{disc_j}}{\|h_{disc_j}\|}, \frac{h_{disc_j}}{\|h_{disc_j}\|}\right]\begin{bmatrix} 0 & 1 \\ -1 & 0 \end{bmatrix}\left[p_j \times \frac{h_{disc_j}}{\|h_{disc_j}\|}, \frac{h_{disc_j}}{\|h_{disc_j}\|}\right]'\sum_{i \in S_j} h_i \dot{\theta}_i$$

Since $\tau_{disc_j}$ lies in a two-dimensional plane, only two of the gimbal rates, $\dot{\theta}_i$, with $i \in S_j$, need to be independent. Therefore, a gimbal controller can gang, or couple, the gimbals in a way that leaves two independent variables. In an exemplary embodiment, if the controller splits $S_j$ into three disjoint subsets, $S_j = S_{ja} \cup S_{jb} \cup S_{jc}$ where $\dot{\theta}_i = \dot{\theta}_{ja}$ for $i \in S_{ja}$, $\dot{\theta}_i = \dot{\theta}_{jb}$ for $i \in S_{jb}$ and $\dot{\theta}_i = (\dot{\theta}_{ja} + \dot{\theta}_{jb})/2$ for $i \in S_{jc}$ then the momenta of those three subsets can be expressed as:

$$h_{ja} = \sum_{i \in S_{ja}} h_i \quad h_{jb} = \sum_{i \in S_{jb}} h_i \quad h_{jc} = \sum_{i \in S_{jc}} h_i \quad (12)$$

Figure 2:
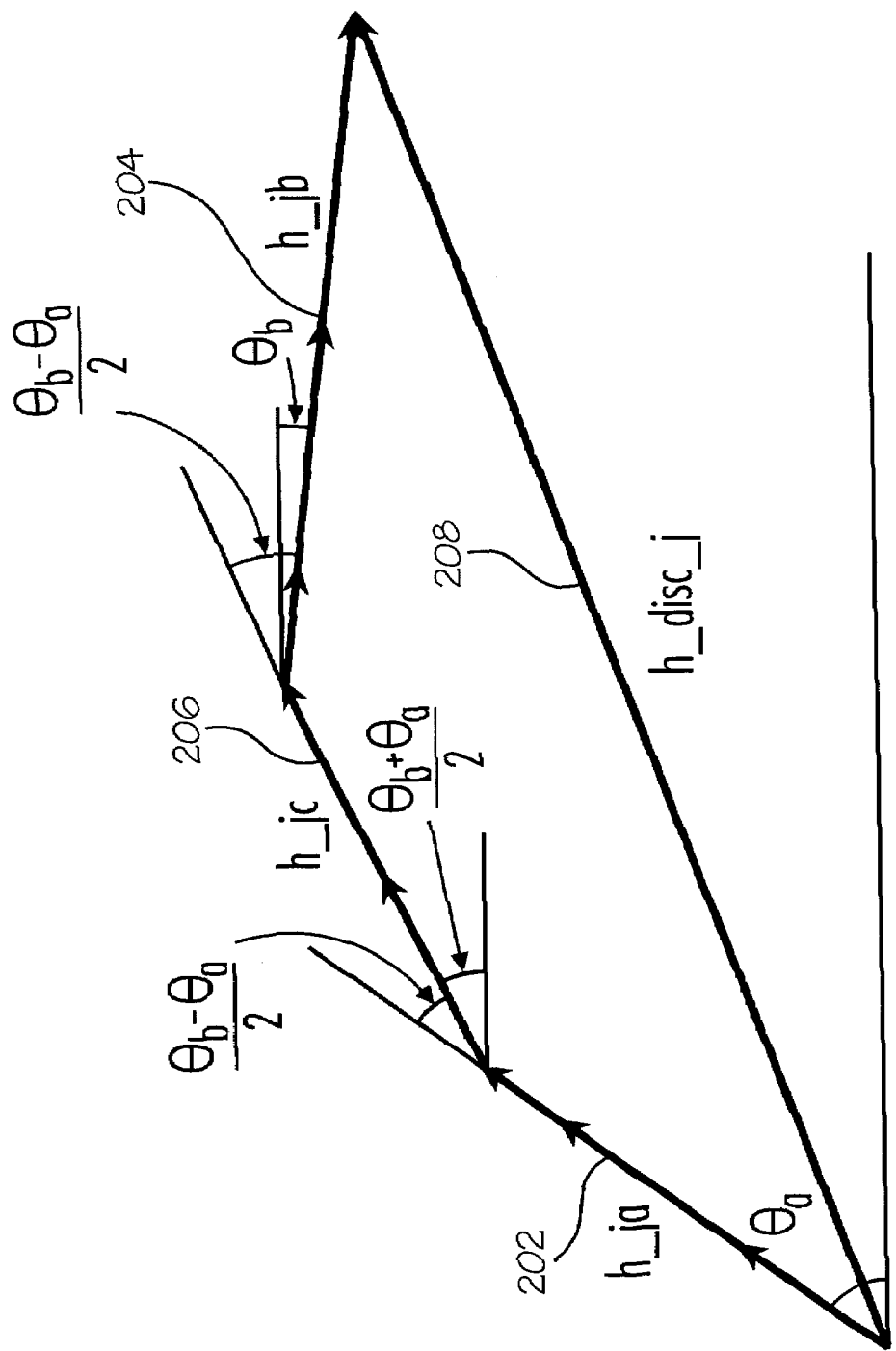
FIG. 2 illustrates momentum vectors for three CMGs having two independent gimbal angles.

FIG. 2 illustrates momentum vectors for a set of collinear CMGs. In FIG. 2, $CMG_a$ provides a first momentum vector 202 ($h_{ja}$) and $CMG_b$ provides a second momentum vector 204 ($h_{jb}$). For $CMG_c$, the gimbal rate is dependent on the gimbal rates of $CMG_a$ and $CMG_b$, and $CMG_c$ provides a third momentum vector 206 ($h_{jc}$). The total momentum vector 208 is the sum of the first momentum vector 202, the second momentum vector 204 and the third momentum vector 206. In this exemplary embodiment, $CMG_c$, has its gimbal angle dependent on the gimbal angles for $CMG_a$ and $CMG_b$. The sum on the right of Eqn. 11, can then be written as:

$$\sum_{i \in S_j} h_i \dot{\theta}_i = h_{ja}\dot{\theta}_{ja} + h_{jb}\dot{\theta}_{jb} + h_{jc}\dot{\theta}_{jc} \quad (13)$$

$$= (h_{ja} + h_{jb} + h_{jc})\frac{\dot{\theta}_{jb} + \dot{\theta}_{ja}}{2} + (h_{jb} - h_{ja})\frac{\dot{\theta}_{jb} - \dot{\theta}_{ja}}{2}$$

giving $\tau_{disc_j}$ as:

$$\tau_{disc_j} = \left[p_j \times \frac{h_{disc_j}}{\|h_{disc_j}\|}, \frac{h_{disc_j}}{\|h_{disc_j}\|}\right]\begin{bmatrix} 0 & 1 \\ -1 & 0 \end{bmatrix}\begin{bmatrix}\left(p_j \times \frac{h_{disc_j}}{\|h_{disc_j}\|}\right)' \\ \left(\frac{h_{disc_j}}{\|h_{disc_j}\|}\right)'\end{bmatrix} \quad (14)$$

$$[h_{disc_j} \quad h_{jb} - h_{ja}]\begin{bmatrix}\frac{\dot{\theta}_{jb} + \dot{\theta}_{ja}}{2} \\ \frac{\dot{\theta}_{jb} - \dot{\theta}_{ja}}{2}\end{bmatrix}$$

Noting that the above 3-by-2 matrix just to the right of the equal sign is orthogonal results in an inverse formula:

$$\begin{bmatrix}\frac{(\dot{\theta}_{jb} + \dot{\theta}_{ja})}{2} \\ \frac{(\dot{\theta}_{jb} - \dot{\theta}_{ja})}{2}\end{bmatrix} = \left(\begin{bmatrix} 0 & 1 \\ -1 & 0 \end{bmatrix}\begin{bmatrix}\left(p_j \times \frac{h_{disc_j}}{\|h_{disc_j}\|}\right)' \\ \left(\frac{h_{disc_j}}{\|h_{disc_j}\|}\right)'\end{bmatrix}[h_{disc_j} \quad h_{jb} - h_{ja}]\right)^{-1} \quad (15)$$

$$\left[p_j \times \frac{h_{disc_j}}{\|h_{disc_j}\|}, \frac{h_{disc_j}}{\|h_{disc_j}\|}\right]' \tau_{disc_j}$$

Since sufficient torque capabilities in all directions is desirable, for the above selection of gimbal rate constraints the following bound can be used:

$$\left\|\begin{bmatrix}(\dot{\theta}_{jb} + \dot{\theta}_{ja})/2 \\ (\dot{\theta}_{jb} - \dot{\theta}_{ja})/2\end{bmatrix}\right\| \leq \quad (16)$$

$$\frac{\sigma_1\left(\left[p_j \times \frac{h_{disc_j}}{\|h_{disc_j}\|}, \frac{h_{disc_j}}{\|h_{disc_j}\|}\right]'\right) * \|\tau_{disc_j}\|}{\sigma_2\left(\begin{bmatrix} 0 & 1 \\ -1 & 0 \end{bmatrix}\left[p_j \times \frac{h_{disc_j}}{\|h_{disc_j}\|}, \frac{h_{disc_j}}{\|h_{disc_j}\|}\right]'[h_{disc_j} \quad h_{jb} - h_{ja}]\right)}$$

This bound can be used to solve for a torque bound:

$$\left(\frac{\|\tau_{disc_j}\|}{\max_{i \in S_j}|\dot{\theta}_i|}\right)^2 \geq \quad (17)$$

$$\frac{1}{2}\left(\min(\|h_{disc_j}\|^2, (\|h_{ja}\| + \|h_{jb}\|)^2 - (\|h_{disc_j}\| - \|h_{jc}\|)^2) - \right.$$

$$\frac{(h_{disc'_j} * (h_{jb} - h_{ja}))^2}{\|\|h_{disc_j}\|^2 - \|\|h_{jb} - h_{ja}\|^2\|\|}\Bigg)$$

This can be expressed as:

$$\frac{\|\tau_{disc_j}\|}{\max_{i \in S_j}|\dot{\theta}_i|} \geq A \tag{18}$$

In the special case where $h_{disc_j}'*(h_{jb}-h_{ja})=0$, the equation $$\|\tau_{disc_j}\|/\max|\dot{\theta}_i| =$$
$$\frac{1}{\sqrt{2}}\min\left(\|h_{disc_j}\|, \sqrt{(\|h_{ja}\| + \|h_{jb}\|)^2 - (\|h_{disc_j}\| - \|h_{jc}\|)^2}\right)$$

can be set equal to A and $\|h_{disc_j}\|$ solved for. This indicates that $h_{disc_j}$ needs to lie in an annulus described by:

$$\sqrt{2}\,A < \|h_{disc_j}\| < \|h_{jc}\| + \sqrt{(\|h_{ja}\| + \|h_{jb}\|)^2 - 2(A)^2} \tag{19}$$

To control the sets of CMGs, in one exemplary embodiment, a controller can divide total momentum, h, amongst k individual discs according to the rule:

$$h_{disc_j} = L_j\left[\sum_{i=1}^{k} L_i\right]^{-1} h + \sum_{i=1}^{k}\alpha_{ji}(p_i \times p_j) \tag{20}$$

where $\alpha_{ji}=\alpha_{ij}$ such that:

$$h = \sum_{j=1}^{k} h_{disc_j} \tag{21}$$

Since the momentum of $h_{disc_j}$ is in the plane perpendicular to unit vector $p_j$, one choice for matrix $L_j$ is the projection matrix onto the plane that is perpendicular to $p_j$:

$$L_j = I - p_j * p_j' \tag{22}$$

The most general choice for $L_j$ can be:

$$L_j = (I - p_j * p_j') * M_j \tag{23}$$

where $M_j$ is any 3-by-3 matrix. The values of $\alpha_{ji}$ can be chosen to maximize the amount of torque available within any given momentum sphere. If each $L_j$ and $\alpha_{ji}$ are constant, then:

$$\tau_{disc_j} = \frac{d}{dt} h_{disc_j} \tag{24}$$

$$= L_j\left[\sum_{i=1}^{k} L_i\right]^{-1} \frac{dh}{dt}$$

$$= L_j\left[\sum_{i=1}^{k} L_i\right]^{-1} \tau$$

Given a commanded torque, Eqn. 24 shows how to distribute that torque amongst the various discs. Gimbal controllers can take each of the $\tau_{disc_j}$ and solve for $\dot{\theta}_i$ for all $i \in S_j$ using the following formula:

$$\tau_{disc_j} = \left[p_j \times \frac{h_{disc_j}}{\|h_{disc_j}\|},\right. \tag{25}$$

$$\frac{h_{disc_j}}{\|h_{disc_j}\|}\begin{bmatrix}0 & 1 \\ -1 & 0\end{bmatrix}\begin{bmatrix}\left(p_j \times \frac{h_{disc_j}}{\|h_{disc_j}\|}\right)' \\ \left(\frac{h_{disc_j}}{\|h_{disc_j}\|}\right)'\end{bmatrix}\begin{bmatrix}h_{disc_j} & h_{jb} - h_{ja}\end{bmatrix}\left.\begin{bmatrix}\frac{\dot{\theta}_{jb} + \dot{\theta}_{ja}}{2} \\ \frac{\dot{\theta}_{jb} - \dot{\theta}_{ja}}{2}\end{bmatrix}\right.$$

The above 3-by-2 matrix just to the right of the equal sign is orthogonal and provides an inverse formula:

$$\begin{bmatrix}\frac{(\dot{\theta}_{jb} + \dot{\theta}_{ja})}{2} \\ \frac{(\dot{\theta}_{jb} - \dot{\theta}_{ja})}{2}\end{bmatrix} = \tag{26}$$

$$\left(\begin{bmatrix}0 & 1 \\ -1 & 0\end{bmatrix}\begin{bmatrix}\left(p_j \times \frac{h_{disc_j}}{\|h_{disc_j}\|}\right)' \\ \left(\frac{h_{disc_j}}{\|h_{disc_j}\|}\right)'\end{bmatrix}\begin{bmatrix}h_{disc_j} & h_{jb} - h_{ja}\end{bmatrix}\right)^{-1}\left[p_j \times \frac{h_{disc_j}}{\|h_{disc_j}\|}, \frac{h_{disc_j}}{\|h_{disc_j}\|}\right]'\tau_{disc_j}$$

$$\begin{bmatrix}\frac{(\dot{\theta}_{jb} + \dot{\theta}_{ja})}{2} \\ \frac{(\dot{\theta}_{jb} - \dot{\theta}_{ja})}{2}\end{bmatrix} = \tag{27}$$

$$\begin{bmatrix}\|h_{disc_j}\| & \frac{h_{disc_j}}{\|h_{disc_j}\|}\cdot(h_{jb} - h_{ja}) \\ 0 & -\left(p_j \times \frac{h_{disc_j}}{\|h_{disc_j}\|}\right)\cdot(h_{jb} - h_{ja})\end{bmatrix}^{-1}\begin{bmatrix}p_j \times \frac{h_{disc_j}}{\|h_{disc_j}\|}, \frac{h_{disc_j}}{\|h_{disc_j}\|}\end{bmatrix}'$$

$$L_j\left[\sum_{i=1}^{k} L_i\right]^{-1}\tau$$

Given any commanded total torque, $\tau$, Eqn. 27 provides the required gimbal rates, using the additional formulas:

$$\dot{\theta}_{ja} = (\dot{\theta}_{jb} + \dot{\theta}_{ja})/2 - (\dot{\theta}_{jb} - \dot{\theta}_{ja})/2$$

$$\dot{\theta}_{jb} = (\dot{\theta}_{jb} + \dot{\theta}_{ja})/2 + (\dot{\theta}_{jb} - \dot{\theta}_{ja})/2$$

$$\dot{\theta}_{jc} = (\dot{\theta}_{jb} + \dot{\theta}_{ja})/2 - \text{coeff} * [\theta_{jc} - (\theta_{jb} + \theta_{ja})/2] \tag{28}$$

where the small positive constant "coeff" corrects any small errors due to discrete integration.

In the special case where $\|h_{jb}\|=\|h_{ja}\|$, then $h_{disc_j}{}'*(h_{jb}-h_{ja})=0$, and $$-\left(p_j \times \frac{h_{disc_j}}{\|h_{disc_j}\|}\right) \cdot (h_{jb} - h_{ja}) = \pm \|h_{jb} - h_{ja}\| \quad (29)$$

Examining FIG. 2, and noting that in the Eqn. 29, $\|h_{jb}-h_{ja}\|/2$ is the distance from the base of a trapezoid to its top, the Pythagorean theorem can be used with the momentum vectors illustrated in FIG. 2 on the two triangular corners of the trapezoid to get:

$$\|h_{jb} - h_{ja}\| = \sqrt{(\|h_{ja}\| + \|h_{jb}\|)^2 - (\|h_{disc_j}\| - \|h_{jc}\|)^2} \quad (30)$$

This reduces Eqn. 27 to:

$$\begin{bmatrix} \frac{(\theta_{jb} + \theta_{ja})}{2} \\ \frac{(\theta_{jb} - \theta_{ja})}{2} \end{bmatrix} = \quad (31)$$

$$\begin{bmatrix} \frac{1}{\|h_{disc_j}\|} & 0 \\ 0 & \frac{\pm 1}{\pm \sqrt{(\|h_{ja}\| + \|h_{jb}\|)^2 - (\|h_{disc_j}\| - \|h_{jc}\|)^2}} \end{bmatrix}$$

$$\begin{bmatrix} \left(p_j \times \frac{h_{disc_j}}{\|h_{disc_j}\|}\right)' \\ \left(\frac{h_{disc_j}}{\|h_{disc_j}\|}\right)' \end{bmatrix} L_j \left[\sum_{i=1}^{k} L_i\right]^{-1} \tau$$

Returning to the general case of Eqn. 27, if $L_j=I-p_j{}^*p'_j$ and $P=[p_1, p_2, \ldots p_k]$ then the annulus in which $h_{disc_j}$ lies can be expressed as:

$$\sqrt{2} A/(k - \|P*P'\|) < \|h_{disc_j}\| < \quad (32)$$

$$\|h_{jc}\| + \sqrt{2\|h_{ja}\|^2 - 2(A/(k - \|P*P'\|))^2}$$

and the torque bound is:

$$\frac{\|\tau\|}{\max_{i \in S_j}|\dot{\theta}_i|} \geq A \quad (33)$$

Therefore, whenever total momentum stays within a ball with a momentum radius of $f(A)$, the available torque should be above some threshold; i.e., for any value of A:

$$\frac{\|\tau\|}{\max_{i \in S_j}|\dot{\theta}_i|} \geq A \quad (34)$$

whenever $\|h\| < f(A)$

The momentum for each set of CMGs, as discussed previously, lies in an annulus of the form:

$$r_1(A) \leq \|h_{disc_j}\| \leq r_2(A) \quad (35)$$

$j = 1, 2, \ldots, k$

Where:

$$r_1(A) = \sqrt{2} A/(k - \|P*P'\|) \quad (36)$$

$$r_2(A) = \min_j \left(\|h_{jc}\| + \sqrt{(2\|h_{ja}\|)^2 - 2(A/(k - \|P*P'\|))^2}\right) \quad (37)$$

when $\|h_{ja}\| = \|h_{jb}\|$ and from Eqn. 20:

$$h_{disc_j} = L_j \left[\sum_{i=1}^{k} L_i\right]^{-1} h + \sum_{i=1}^{k} \alpha_{ji}(p_i \times p_j) \quad (38)$$

The $\alpha_{ji}$ should be chosen to ensure that each $h_{disc_j}$ lies in its appropriate annulus when total momentum lies in the largest possible ball, $\|h\|<f(A)$. Eqns. 35-37 indicate that $h_{disc_j}$ lies in an ellipse, with center determined by $\alpha_{ji}$, when $\|h\|<f(A)$. For each value of "A", the values of $\alpha_{ji}$ are chosen to maximize the size of the $h_{disc_j}$ ellipses, which lie between the inner and outer radii of the corresponding annuli.

$$\alpha(A) = \arg\left[\max_{\alpha_{ji}}\left\{f(A) \text{ such that } r_1(A) \leq \right.\right. \quad (39)$$

$$\left\|h_{disc_j}(h, \alpha_{ji})\right\| \leq r_2(A) \text{ for all } \|h\| \leq f(A)\right\}\Big]$$

$$= \arg\left[\max_{\alpha_{ji}}\left\{f(A) \text{ such that } r_1(A) \leq \left\|L_j\left[\sum_{i=1}^{k} L_i\right]^{-1} h + \right.\right.\right.$$

$$\left.\left.\left.\sum_{i=1}^{k} \alpha_{ji}(p_i \times p_j)\right\| \leq r_2(A) \text{ for all } \|h\| \leq f(A)\right\}\right]$$

When there are three sets of collinear CMGs, there are three independent $\alpha_{ji}$, i.e., $(\alpha_{12}, \alpha_{23}, \alpha_{31})$ and three ellipses whose origin must be adjusted to allow the ellipses to be as large as possible, while still being inside the three annuli. In embodiments where there are two sets of collinear CMGs, there is one independent $\alpha_{ji}$, i.e. $\alpha=\alpha_{12}$ and two ellipses whose origin must be moved to allow the two ellipses to be as large as possible, while still being inside the two annuli. As $f(A)$ is optimized, the ellipses touch the annuli in two or three places.

In the exemplary embodiment of two sets of collinear CMGs, the earlier equations reduce to:

$$h_{disc1} = L_1[L_1+L_2]^{-1}h + \alpha(p_1 \times p_2) \quad (40)$$

$$h_{disc2} = L_2[L_1+L_2]^{-1}h - \alpha(p_1 \times p_2) \quad (41)$$

where the value of α can be chosen to maximize the torque that is available within any given size momentum ball.

If $L_1$, $L_2$ and α are constant, then:

$$\tau_{disc_1} = \frac{d}{dt}h_{disc_1} = L_1[L_1+L_2]^{-1}\frac{dh}{dt} = L_1[L_1+L_2]^{-1}\tau \quad (42)$$

$$\tau_{disc_2} = \frac{d}{dt}h_{disc_2} = L_2[L_1+L_2]^{-1}\frac{dh}{dt} = L_2[L_1+L_2]^{-1}\tau \quad (43)$$

Figure 3:
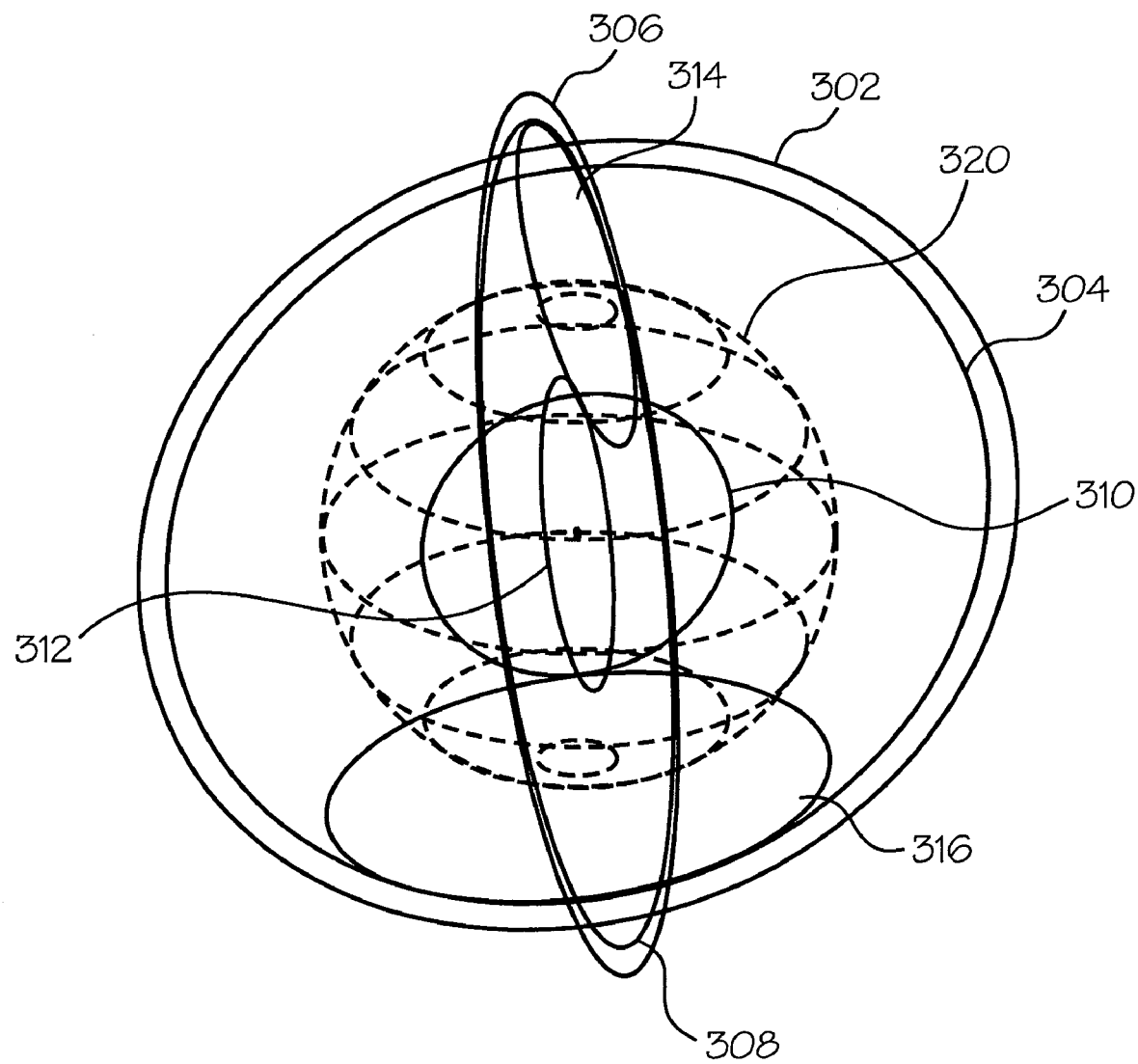
FIG. 3 illustrates momentum ellipses in relation to annular regions formed by torque boundaries that avoid singularities.

FIG. 3 illustrates a first outer boundary 306 and a second outer boundary 302 for $h_{disk1}$ and $h_{disk2}$ respectively. The first outer boundary 306 and the second outer boundary 302 represent the maximum achievable momentum for hdisk1 and $h_{disk2}$. The first outer boundary 306 and the second outer boundary 302, in the exemplary embodiment shown in FIG. 3, are circular boundaries with a radius $r_2(A_{min})$. Since there is a possibility of the existence of a singularity (or insufficient torque, where $\|\tau\| \geq A_{MIN}\|\dot{\theta}\|$) at the maximum momentum, a smaller momentum boundary in which to operate the CMGs can be chosen, which guarantees some larger torque level (where $\|\tau\| > A\|\dot{\theta}\|$). For example, a first reduced maximum boundary 308 and a second reduced maximum boundary 304 can be selected as the maximum momentum for each of the two discs. The radius of the first reduced maximum boundary 308 and a second reduced maximum boundary 304 is $r_2(A)$, where $r_2(A) < r_2(A_{min})$.

In addition, singularities can exist at or near the origin, O, of each of the two momentum discs. Therefore, a first increased minimum boundary 312, and a second increased minimum boundary 310 can be defined. The radius of the first increased minimum boundary 312 and the second increased minimum boundary 310 can be denoted as $r_1(A)$. First reduced maximum boundary 308 and first increased minimum boundary 312 define an annulus for $h_{disk1}$ and the second reduced maximum boundary 304 and the second increased minimum boundary 310 define an annulus for $h_{disk2}$. A first ellipse 314 lies within the annulus defined by the first reduced maximum boundary 308 and first increased minimum boundary 312 and a second ellipse 316 lies within the annulus defined by the second reduced maximum boundary 304 and the second increased minimum boundary 310. The first ellipse 314 is where the $h_{disk1}$ lies and the second ellipse 316 is where the $h_{disk2}$ lies when $\|h\| = \|h_{disc_1} + h_{disc_2}\| \leq f$ (A) lies within a sphere of radius f(A). In FIG. 3, sphere 320 is the momentum sphere formed by the combination of first ellipse 314 and second ellipse 316.

To maximize the radius f(A), which will maximize the momentum for a given size torque limit, "A," an ellipse offset function α(A) is calculated. If the normal vectors, p1 and p2, of the two momentum discs are chosen to be orthogonal, then $p_1'*p_2=0$, and the entire system of CMGs can be rotated until those two unit vectors line up with the first two coordinate axes:

$$p_1 = \begin{bmatrix} 1 \\ 0 \\ 0 \end{bmatrix} \quad (44)$$

$$p_2 = \begin{bmatrix} 0 \\ 1 \\ 0 \end{bmatrix} \text{ and } p_1 \times p_2 = \begin{bmatrix} 0 \\ 0 \\ 1 \end{bmatrix}$$

This gives:

$$L_1 = I - p_1 * p_1' = \begin{bmatrix} 0 & 0 & 0 \\ 0 & 1 & 0 \\ 0 & 0 & 1 \end{bmatrix} \quad (45)$$

$$L_2 = I - p_2 * p_2' = \begin{bmatrix} 1 & 0 & 0 \\ 0 & 0 & 0 \\ 0 & 0 & 1 \end{bmatrix}$$

and $$L_1(L_1+L_2)^{-1} = \begin{bmatrix} 0 & 0 & 0 \\ 0 & 1 & 0 \\ 0 & 0 & 1/2 \end{bmatrix} \quad (46)$$

$$L_2(L_1+L_2)^{-1} = \begin{bmatrix} 1 & 0 & 0 \\ 0 & 0 & 0 \\ 0 & 0 & 1/2 \end{bmatrix}$$

This results in two ellipses with each ellipse representing the momentum of a set of CMGs.

$$h_{disc_1} = L_1[L_1+L_2]^{-1}h + \alpha(p_1 \times p_2) = \begin{bmatrix} 0 \\ h_y \\ h_z/2 + \alpha \end{bmatrix} \quad (47)$$

$$h_{disc_2} = L_2[L_1+L_2]^{-1}h - \alpha(p_1 \times p_2) = \begin{bmatrix} h_x \\ 0 \\ h_z/2 - \alpha \end{bmatrix} \quad (48)$$

To maximize the size, f(A), of the 3D momentum sphere, the function α(A) needs to be chosen such that it determines the two ellipse centers at ±[0;0;α], which will keep each ellipse within its annulus whose inner radius is r1 and outer radius is r2.

$$\alpha(A) = \quad (49)$$

$$\arg\left[\max_{\alpha} \left\{ f(A) \text{ s.t. } r_1(A) \leq \left\| \begin{bmatrix} h_y \\ \frac{h_z}{2} + \alpha \end{bmatrix} \right\| \leq r_2(A) \;\&\; r_1(A) \leq \left\| \begin{bmatrix} h_x \\ \frac{h_z}{2} - \alpha \end{bmatrix} \right\| \leq r_2(A) \text{ for all } \left\| \begin{bmatrix} h_x \\ h_y \\ h_z \end{bmatrix} \right\| \leq f(A) \right\} \right]$$

The maximum of f(A) is attained when each ellipse touches both the inner and outer radii of each corresponding annulus. Since each ellipse has a similar structure, the same value of α causes each ellipse to touch both inner and outer radii of its corresponding annulus. For each optimum value of α, the same optimum value would be achieved by changing the sign on α, so only positive values of α are considered. Consider the first ellipse, whose equation is:

$$\begin{bmatrix} x \\ y \\ z \end{bmatrix} = \begin{bmatrix} 0 \\ h_y \\ \frac{h_z}{2} + \alpha \end{bmatrix} \quad (50)$$

such that $$\left\| \begin{bmatrix} h_x \\ h_y \\ h_z \end{bmatrix} \right\| \le f$$

or $(y)^2 + (2*(z-\alpha))^2 = f^2$ ellipse in $(y, z)$ plane.

The point $[x,y,z]=[0,0,r_1(A)]$ is where an ellipse just touches its annular boundaries at the smallest radius, $r_1(A)$. If the points $[0,\pm y_0, z_0]$ are where the ellipse just touches its annular boundaries at the largest radius, $r_2(A)$, then the following equations for the values of $\alpha(A)$, $f(A)$, $y_0(A)$ and $z_0(A)$ can be solved, using the known intermediate functions $r_1(A)$ and $r_2(A)$:

$(y_0)^2+(z_0)^2=(r_2(A))^2$ since $[0\pm,y_0,z_0]$ lie on circle of radius $r_2(A)$ (51)

$(y_0)^2+(2*(z_0-\alpha))^2=f^2$ since $[0,\pm y_0,z_0]$ lie on ellipse (52)

$$\frac{-y_0}{z_0} = \frac{dz_0}{dy_0} = \frac{-y_0}{4*(z_0-\alpha)} \quad (53)$$

equating slopes of above circle and ellipse equations $(2*(r_1(A)-\alpha))^2=f^2(A)$ since $[0,0,r_1(A)]$ lies on ellipse (54)

The two solutions of Eqn. 53 are:

$y_0=0$ or $z_0=4*(z_0-\alpha)$ where $r_1(A)<\alpha<r_2(A)$ (55)

Using these two solutions to solve the remaining three equations gives:
Solution 1:

$y_0 = 0$ (56)

$z_0 = r_2$ (57)

$$\alpha = \frac{r_1(A) + r_2(A)}{2} \quad (58)$$

$f_{solution\,1}(A) = r_2(A) - r_1(A)$ (59)

Solution 2: The $z_0=4*(z_0-\alpha)$ solution implies that $z_0=4\alpha/3$. Subtracting equations 51 and 52 eliminates $y_0$, leaving:

$3*(z_0)^2-(8\alpha)*z_0+(4\alpha^2+r_2(A)^2-f^2(A))=0$ (60)

Substituting $z_0=4\alpha/3$ into this equation gives:

$$3*\left(\frac{4\alpha}{3}\right)^2 - (8\alpha)*\left(\frac{4\alpha}{3}\right) + (4\alpha^2 + r_2^2 - f^2) = 0 \quad (61)$$

or $4\alpha^2 = 3(r_2(A)^2 - f(A)^2)$ (62)

In order for the ellipse to be inside the annulus, $\alpha > r_1(A)$. Given $\alpha > r_1(A)$, Eqn. 54 is:

$$\alpha = r_1(A) + \frac{f(A)}{2} \quad (63)$$

Substituting Eqn. 63 into Eqn. 62 results in:

$$4\left(r_1(A) + \frac{f(A)}{2}\right)^2 = 3(r_2(A)^2 - f(A)^2) \quad (64)$$

Solving this quadratic equation for f, and keeping the positive solution gives the value of f for solution$_2$:

$$f_{solution2}(A) = \frac{-r_1(A) + \sqrt{3(r_2(A)^2 - r_1(A)^2)}}{2} \quad (65)$$

Note that for any given value of $r_1(A)/r_2(A)$, both solution 1 and solution 2' will give an ellipse that is tangent to both the inner and outer radius of the annulus, but exactly one of the solutions will give an ellipse that is totally inside the annulus. Setting $f_{solution1}(A)=f_{solution2}(A)$ gives $r_2(A)=2r_1(A)$ where the valid solution switches between solution 1 and solution 2. For $r_2(A)<2r_1(A)$, solution 1 gives an ellipse that is inside the annulus. For $r_2(A)>2r_1(A)$, solution 2 gives an ellipse that is inside the annulus. This is illustrated in FIG. 4a and FIG. 4b. FIG. 4a illustrates a first ellipse 402 inside a first annular region 404 where $2r_1(A)>r_2(A)$. FIG. 4b illustrates a second ellipse 406 inside a second annular region 408 where $2r_1(A)<r_2(A)$. Solution 1 can be used for the situation depicted in FIG. 4a and solution$_2$ can be used for the situation depicted in FIG. 4b.

To complete the solutions, recall from earlier in this section that:

$r_1(A) = \sqrt{2}\,A$ (66)

$$r_2(A) = \min_{j=1,2} \left( \|h_{jc}\| + \sqrt{(2\|h_{ja}\|)^2 - 2A^2} \right) \quad (67)$$

where $\|h_{jb}\| = \|h_{ja}\|$

In the case where each of the two discs has three collinear CMGs, and all six $\|h_i\|$ are equal:

$r_1(A) = \sqrt{2}\,A$ (68)

$r_2(A) = \|h_i\| + \sqrt{(2\|h_i\|)^2 - 2A^2}$ (69)

where all six
$\|h_i\|$ are equal

The maximum value of A with all six $\|h_i\|$ equal and or $r_1(A) < r_2(A)$, $$A < \|h_i\| \frac{1+\sqrt{7}}{2\sqrt{2}}.$$

In the case where either or both of the two discs has lost one of its three collinear CMGs, label the lost CMG as $\|h_{jc}\|$ thus:

$$r_1(A) = \sqrt{2}A \quad (70)$$

$r_2(A) = 0 + \sqrt{(2\|h_i\|)^2 - 2A^2}$ where all unfailed $\|h_i\|$ are equal. (71)

$A < \|h_i\|$ represents the maximum value of A after a failure.

In summary, to ensure that available torque is above some threshold, A, whenever total momentum stays within some ball of a given size, f(A):

$$\frac{\|\tau\|}{\max_i |\dot{\theta}_i|} \geq A \text{ whenever} \|h\| \leq f(A) \quad (72)$$

we need f(A) to be given by:

$$f(A) = \begin{cases} r_2(A) - r_1(A) & \text{when } r_2 < 2r_1 \\ \frac{\sqrt{3(r_2(A)^2 - r_1(A)^2)} - r_1(A)}{2} & \text{when } r_2(A) > 2r_1(A) \end{cases} \quad (73)$$

Figure 5:
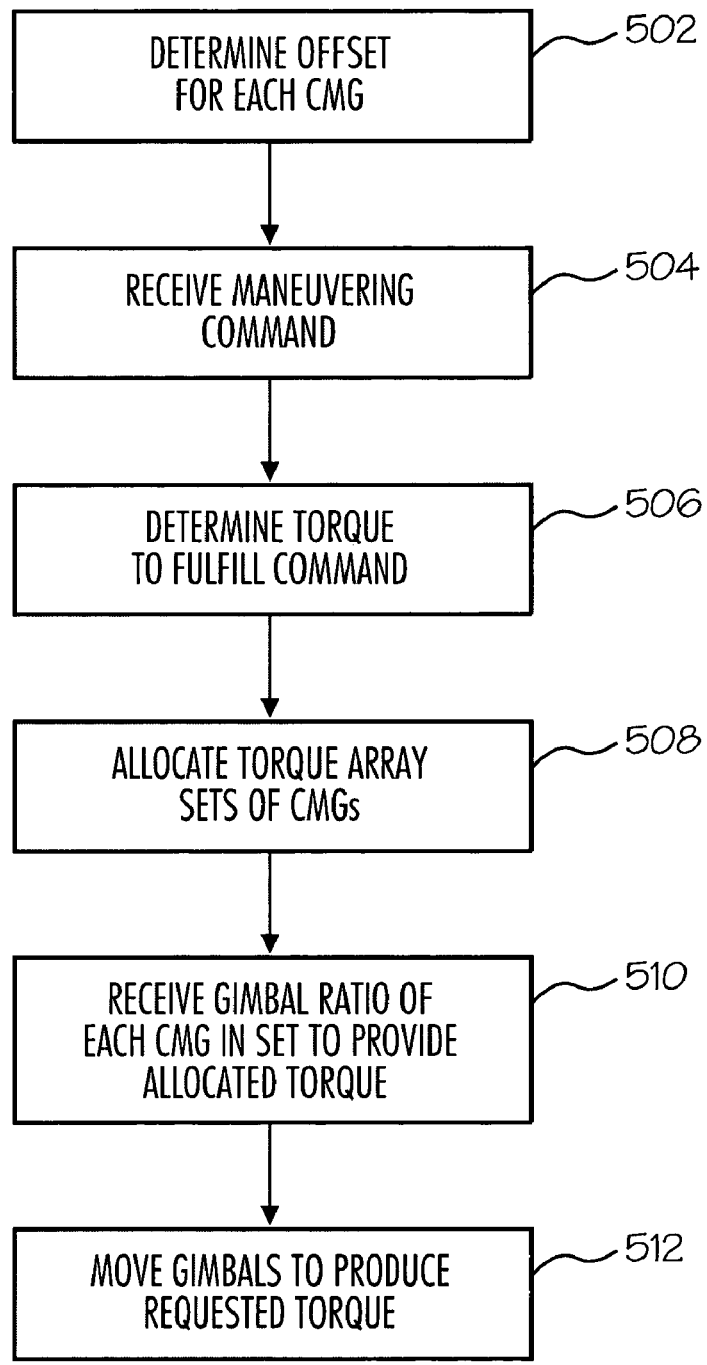
FIG. 5 is a flowchart illustrating a method for maneuvering a spacecraft in accordance with an exemplary embodiment of the present invention.

FIG. 5 is a flowchart of an exemplary method for controlling sets of collinear CMGs. In a first step, step 502, an offset value for each set of CMGs is determined. The offset value determines the maximum momentum ellipse for a set of CMGs that is fully within an annular region derived from the total momentum available from all sets of CMGs. In the exemplary embodiment where there are two orthogonal sets of CMGs, with each set containing three CMGs, the offset value can be determined using Eqn. 73. By determining the appropriate ellipse for each set of CMGs, a guaranteed minimum amount of torque can be calculated.

Next, in step 504, a maneuvering command to rotate spacecraft orientation is received. In one exemplary embodiment, the maneuvering command is sent from a ground control station to the attitude control system 102 of the spacecraft. Alternatively, the maneuvering command may be generated by the spacecraft based, for example, on a preplanned movement schedule.

After the maneuvering command is received, the torque required for each set of CMGs is determined in step 506. In one embodiment, the needed torque for all sets of collinear CMGs to provide the required maneuver is determined. Then, in step 508, the total torque needed is split into the individual torque required for each set of CMGs which is determined using Eqn. 24. Alternatively, the momentum needed to maneuver the spacecraft can be determined and allocated between each set of CMGs. Torque can then be calculated by taking the derivative of the momentum. These calculations can be done at the attitude control system 102.

In step 510, gimbal rates for each CMG in a set of CMGs are determined. The gimbal rates can be determined by Eqns. 27-28. In one exemplary embodiment, the gimbal rates can be determined by the momentum actuator control processor.

In step 512, the gimbals for each of the collinear CMGs for each set of collinear CMGs are then moved to provide the proper momentum.

The exemplary embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. A method for controlling the movement of two or more sets of collinear control moment gyroscope (CMGs) in an array of CMGs in a spacecraft comprising:
   determining an offset for each set of the two or more sets of collinear CMGs that guarantees at least a minimum amount of three dimensional torque without using an attitude trajectory of the spacecraft;
   receiving a command to adjust an orientation of the spacecraft;
   determining a total torque needed to adjust the orientation of the spacecraft, based at least in part on the minimum amount of three dimensional torque and the command;
   allocating the total torque to produce an allocated torque for each set of the two or more sets of collinear CMGs; and
   calculating a required gimbal movement for each set of collinear CMGs in the two or more sets of collinear CMGs from the allocated torque in order to fulfill the command.

2. The method of claim 1, wherein the step of determining an offset further comprises maximizing an ellipse representative of the momentum space in an annular region for one set of the two or more sets of collinear CMGs.

3. The method of claim 1, wherein the step of determining an offset further comprises allocating an annular region based on a maximum momentum boundary that avoids the edge of a momentum space and a minimum momentum boundary that avoids a center of the momentum space.

4. The method of claim 1, wherein the step of determining an offset further comprises determining a torque bound for a given momentum radius.

5. The method of claim 1, wherein the step of calculating a required gimbal movement further comprises calculating a required gimbal movement for each of the remaining CMGs in a set of collinear CMGs after the failure of a CMG.

6. The method of claim 1, wherein the step of determining the total torque further comprises:
   calculating a total torque needed to adjust the orientation of the spacecraft by taking the derivative of a total momentum; and
   determining if the total momentum exceeds an available momentum sphere having a radius.

7. A control system of a spacecraft for controlling two or more sets of collinear control moment gyroscopes (CMGs), the control system comprising:
   an attitude control system configured to:
      receive a command to adjust an orientation of the spacecraft;
      determine an offset for a momentum ellipse for each of the two or more sets of collinear CMGs that guarantees at least a minimum amount of three dimensional torque without using an attitude trajectory of the spacecraft;

determine a momentum needed from the two or more sets of collinear CMGs to adjust the orientation of the spacecraft, based at least in part on the minimum amount of three dimensional torque and the command;

calculate a total torque needed in order to fulfill the command by taking the derivative of the momentum; and a momentum actuator control processor coupled to the attitude control system, the momentum actuator control processor configured to calculate a required gimbal movement in order to fulfill the command for each of the CMGs in each of the two or more sets of collinear CMGs from total torque.

8. The system of claim 7, wherein the attitude control system is further configured to allocating the total torque to produce an allocated torque for each set of the two or more sets of collinear CMGs.

9. The system of claim 7, wherein the attitude control system is further configured to determine if the momentum needed exceeds the momentum available in a momentum sphere having a radius.

10. The system of claim 7, wherein the attitude control system is further configured to determine an offset for a momentum disk by maximizing an ellipse representative of the momentum space in an annular region for each set of the two or more sets of collinear CMGs.

11. The system of claim 7, wherein the attitude control system is further configured to determine a torque bound for a given momentum radius.

12. The system of claim 7, the attitude control system is further configured to calculating a required gimbal movement for each of the remaining CMGs in a set of collinear CMGs after the failure of a CMG in the set of collinear CMGs.

13. A method for singularity free movement of an array of control moment gyroscopes (CMGs) comprising:

allocating the array of CMGs as at least two sets of collinear CMGs, calculating an offset for a momentum ellipse for each of the at least two sets of collinear CMGs that guarantees at least a minimum amount of three dimensional torque without using an attitude trajectory of the spacecraft;

determining a momentum radius, the momentum radius defining a sphere of allowable momentum;

determining if a requested momentum to change the orientation of a spacecraft is within the sphere of allowable momentum, based at least in part on the minimum amount of three dimensional torque and the momentum radius; and determining a gimbal movement needed for each CMG to provide the requested momentum if the requested momentum is within the sphere of allowable momentum.

14. The method of claim 13, wherein the step of calculating an offset for a momentum ellipse further comprises maximize the size of the momentum ellipse within an annular region.

15. The method of claim 13, wherein the step of determining a gimbal movement for each CMG further comprises:

determining a total torque to change the orientation of the spacecraft by taking the derivative of the requested momentum;

allocating the total torque to produce an allocated torque for each set of the at least two sets of collinear CMGs; and calculating the gimbal movement for each set of the CMGs in the at least two sets of collinear CMGs from the allocated torque.

* * * * *